United States Patent
Gomita et al.

(10) Patent No.: US 9,467,646 B2
(45) Date of Patent: Oct. 11, 2016

(54) APPARATUS AND METHOD FOR PROCESSING IMAGE SIGNAL, IMAGING APPARATUS, AND METHOD FOR DISPLAYING IMAGE

(71) Applicant: Sony Corporation, Tokyo (JP)

(72) Inventors: Jun Gomita, Kanagawa (JP); Koji Kamiya, Kanagawa (JP)

(73) Assignee: Sony Corporation, Tokyo (JP)

(*) Notice: Subject to any disclaimer, the term of this patent is extended or adjusted under 35 U.S.C. 154(b) by 170 days.

(21) Appl. No.: 14/254,186

(22) Filed: Apr. 16, 2014

(65) Prior Publication Data

US 2014/0347557 A1  Nov. 27, 2014

(30) Foreign Application Priority Data

May 23, 2013 (JP) ................................ 2013-109399

(51) Int. Cl.
  H04N 5/225 (2006.01)
  H04N 7/01 (2006.01)
  G06T 3/40 (2006.01)

(52) U.S. Cl.
  CPC ............ H04N 7/0125 (2013.01); G06T 3/403 (2013.01); H04N 7/0117 (2013.01); H04N 7/0142 (2013.01)

(58) Field of Classification Search
  None
  See application file for complete search history.

(56) References Cited

U.S. PATENT DOCUMENTS

| 4,782,399 A * | 11/1988 | Sato .................. G06T 3/403 358/443 |
| 7,840,094 B2 * | 11/2010 | Haga ................... G06T 7/0083 348/441 |
| 2002/0047851 A1 * | 4/2002 | Hirase ................ H04N 5/44504 345/660 |
| 2004/0051793 A1 * | 3/2004 | Tecu .................... H04N 5/772 348/231.99 |
| 2007/0052836 A1 * | 3/2007 | Yamada ............. H04N 5/23293 348/345 |
| 2009/0180552 A1 * | 7/2009 | Visharam ........... H04N 19/176 375/240.26 |
| 2010/0277645 A1 * | 11/2010 | Miura .................. G06T 3/4084 348/557 |
| 2014/0022419 A1 * | 1/2014 | Hirai .................. H04N 5/23229 348/241 |

FOREIGN PATENT DOCUMENTS

JP  2007-060328  3/2007

* cited by examiner

*Primary Examiner* — Twyler Haskins
*Assistant Examiner* — Dwight C Tejano
(74) *Attorney, Agent, or Firm* — Michael Best & Friedrich LLP

(57) ABSTRACT

An image signal processing apparatus includes a down-converter unit configured to down-convert an image signal having a first resolution into an image signal having a second resolution lower than the first resolution, a high-frequency-band-edge detection unit configured to perform filtering on the image signal having the first resolution to extract components in a higher frequency band than a frequency corresponding to the second resolution and to perform down-conversion on an edge detection signal obtained through the filtering to obtain an edge detection signal having the second resolution, and a combination unit configured to combine the edge detection signal obtained by the high-frequency-band-edge detection unit with the image signal having the second resolution generated by the down-converter unit so as to obtain an image signal having the second resolution and being to be displayed.

18 Claims, 8 Drawing Sheets

FIG. 2

| R | G | R | G | R | G |
|---|---|---|---|---|---|
| G | B | G | B | G | B |
| R | G | R | G | R | G |
| G | B | G | B | G | B |

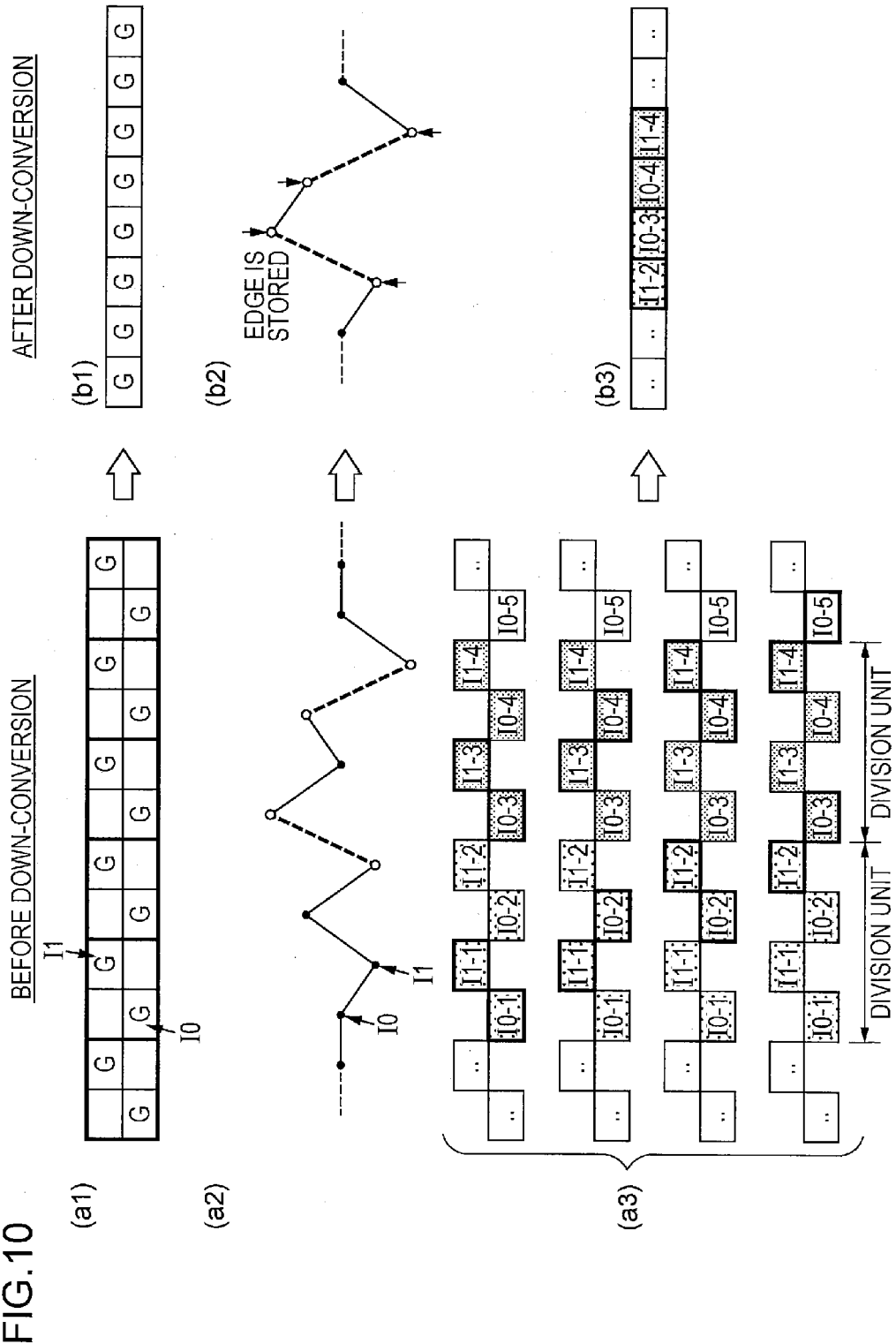

APPARATUS AND METHOD FOR PROCESSING IMAGE SIGNAL, IMAGING APPARATUS, AND METHOD FOR DISPLAYING IMAGE

CROSS REFERENCE TO RELATED APPLICATIONS

This application claims the benefit of Japanese Priority Patent Application JP 2013-109399 filed May 23, 2013, the entire contents of which are incorporated herein by reference.

BACKGROUND

The present technology relates to an image signal processing apparatus, a method for processing an image signal, an imaging apparatus, and a method for displaying an image. More specifically, the present technology relates to an image signal processing apparatus and the like which process an image signal having a high resolution to obtain an image signal having a low resolution and being to be displayed.

In general, a camera (imaging apparatus) includes a viewfinder (display device) for checking, in real time, the composition or focus of an image being captured. Preferably, the viewfinder can faithfully reproduce thereon the view angle or resolution of the image being captured. However, many 4K-resolution imaging apparatuses (4K cameras), for example, use a viewfinder having a resolution lower than that of images to be captured, such as a high-definition (HD) resolution, so as to make it easy to move or place the imaging apparatuses.

The function of highlighting edge information extracted from a viewfinder image (edge display function) has been known as a marker for helping manually achieve focus on the viewfinder (for example, see Japanese Unexamined Patent Application Publication No. 2007-060328). Since the change (edge) in signal level is abrupt in the portion in focus, this function allows the user to check the degree of focus by looking at the highlighted edge.

SUMMARY

However, the image outputted to the HD-resolution viewfinder does not include edge information of the 4K-resolution image in a higher frequency band than the Nyquist frequency of the image. Even if edge information of the 4K-resolution image is obtained from a source other than the image outputted to the viewfinder, the sampling theorem prevents the HD-resolution viewfinder from displaying the edge information. That is, only HD-resolution edge information is displayed by the edge display function of the HD-resolution viewfinder. For this reason, the user has difficulty in achieving accurate focus on the 4K-resolution camera.

It is desirable to display, on the display device, edge information having a higher resolution than that of the display device.

An image signal processing apparatus according to a first embodiment of the present technology includes a down-converter unit configured to down-convert an image signal having a first resolution into an image signal having a second resolution lower than the first resolution, a high-frequency-band-edge detection unit configured to perform filtering on the image signal having the first resolution to extract components in a higher frequency band than a frequency corresponding to the second resolution and to perform down-conversion on an edge detection signal obtained through the filtering to obtain an edge detection signal having the second resolution, and a combination unit configured to combine the edge detection signal having the second resolution obtained by the high-frequency-band-edge detection unit with the image signal having the second resolution generated by the down-converter unit so as to obtain an image signal having the second resolution and being to be displayed.

In the first embodiment of the present technology, the down-converter unit down-converts the image signal having the first resolution into the image signal having the second resolution lower than the first resolution. For example, the first resolution may be a 4K resolution, and the second resolution may be an HD resolution. Also, the first resolution may be the resolution of the camera (imaging resolution), and the second resolution may be the resolution of the viewfinder (display resolution).

The high-frequency-band-edge detection unit performs the filtering on the image signal having the first resolution to extract components in the higher frequency band than the frequency corresponding to the second resolution and then performs down-conversion on the edge detection signal obtained through the filtering to obtain the edge detection signal having the second resolution.

For example, assuming that a down-conversion ratio is N:1, N being an integer of 2 or more, the down-conversion performed by the high-frequency-band-edge detection unit may include dividing the edge detection signal obtained through the filtering into units of 2N pixels, generating continuous 2N sets of two pixels from edge detection signals corresponding to 2N pixels of each division unit and the first pixel of a division unit following the division unit, the 2N pixels and the first pixel being continuous, and extracting, from the 2N sets, a set of two pixels having the largest absolute difference. This down-conversion can be performed without causing loss of high-resolution-edge components.

For example, the high-frequency-band-edge detection unit may normalize the edge detection signal obtained through the filtering by dividing the edge detection signal by an average of levels of the image signal having the first resolution and then perform the down-conversion on the normalized edge detection signal. By performing such a normalization process, false detection of the edge in a bright area is reduced, and detection of the edge in a dark area is facilitated.

For example, the image signal having the first resolution may be an image signal outputted from a single-CCD color imaging unit including an image sensor having a Bayer color filter array, and the high-frequency-band-edge detection unit may obtain the edge detection signal having the second resolution on the basis of signals of diagonally arranged green pixels.

The combination unit combines the edge detection signal having the second resolution obtained by the high-frequency-band-edge detection unit with the image signal having the second resolution generated by the down-converter unit so as to obtain the image signal having the second resolution and being to be displayed.

As seen above, according to the first embodiment of the present technology, the image signal having the first resolution is down-converted into the image signal having the second resolution, and the edge detection signal having the second resolution is combined with the image signal having the second resolution so as to obtain the image signal having the second resolution and being to be displayed. This edge detection signal having the second resolution is obtained by performing filtering on the image signal having the first resolution to extract components in the higher frequency band than the frequency corresponding to the second resolution and then down-converting the edge detection signal obtained through the filtering.

Thus, edge information having the higher resolution than that of the display device can be displayed on the display device. Specifically, edge information of the high-resolution (e.g., 4K-resolution) image signal can be displayed on the low-resolution (e.g., HD-resolution) viewfinder (display device). As a result, the user can achieve accurate focus on the high-resolution camera using the edge information displayed on the low-resolution viewfinder.

For example, the image signal processing apparatus according to the first embodiment of the present technology may further include a low-frequency-band-edge detection unit configured to obtain an edge detection signal having the second resolution on the basis of the image signal having the second resolution generated by the down-converter unit, and the combination unit may combine, with the image signal having the second resolution generated by the down-converter unit, a first edge detection signal being the edge detection signal having the second resolution obtained by the high-frequency-band-edge detection unit and a second edge detection signal being the edge detection signal obtained by the low-frequency-band-edge detection unit so as to obtain the image signal having the second resolution and being to be displayed.

For example, the combination unit may combine the first and second edge detection signals with the image signal having the second resolution in such a manner that the edge information displayed based on the first edge detection signal and the edge information displayed based on the second edge detection signal can be distinguished from each other. In this case, distinction between the edge information displayed based on the first edge detection signal and the edge information displayed based on the second edge detection signal is made by a difference in one of hue, luminance, and line type.

Thus, the sets of edge information in the high and low frequency bands can be simultaneously displayed (e.g., the edges in those frequency bands can be highlighted) on the display device. As a result, the user can achieve focus more easily. For example, the user can achieve rough focus while looking at the displayed low-frequency-band-edge information and then achieve precise focus while looking at the displayed high-frequency-band-edge information. Since the two sets of edge information are displayed in a distinguishable manner, the user can easily distinguish the displayed edges from each other.

An imaging apparatus according to a second embodiment of the present technology includes an imaging unit configured to obtain an image signal having a first resolution and an image signal processing unit configured to process the image signal having the first resolution obtained by the imaging unit to obtain an image signal having a second resolution lower than the first resolution and being to be displayed on a viewfinder. The image signal processing unit includes a down-converter unit configured to down-convert the image signal having the first resolution into an image signal having the second resolution, a high-frequency-band-edge detection unit configured to perform filtering on the image signal having the first resolution to extract components in a higher frequency band than a frequency corresponding to the second resolution and to perform down-conversion on an edge detection signal obtained through the filtering to obtain an edge detection signal having the second resolution, and a combination unit configured to combine the edge detection signal having the second resolution obtained by the high-frequency-band-edge detection unit with the image signal having the second resolution generated by the down-converter unit so as to obtain an image signal having the second resolution and being to be displayed.

In the second embodiment of the present technology, the imaging unit obtains the image signal having the first resolution. The image signal processing unit processes the image signal having the first resolution to obtain the image signal having the second resolution lower than the first resolution and being to be displayed on the viewfinder. For example, the first resolution may be a 4K resolution, and the second resolution may be an HD resolution.

The image signal processing unit includes the down-converter unit, the high-frequency-band-edge detection unit, and the combination unit. The down-converter unit down-converts the image signal having the first resolution into the image signal having the second resolution lower than the first resolution. The high-frequency-band-edge detection unit performs filtering on the image signal having the first resolution to extract components in the frequency band higher than the frequency corresponding to the second resolution and then down-converts the edge detection signal obtained through the filtering to obtain the edge detection signal having the second resolution. The combination unit combines the edge detection signal having the second resolution obtained by the high-frequency-band-edge detection unit with the image signal having the second resolution generated by the down-converter unit to obtain the image signal having the second resolution and being to be displayed.

As seen above, according to the second embodiment of the present technology, the image signal having the first resolution obtained by the imaging unit is down-converted into the image signal having the second resolution, and the edge detection signal having the second resolution is combined with the image signal having the second resolution to obtain the image signal having the second resolution and being to be displayed. This edge detection signal having the second resolution is obtained by performing filtering on the image signal having the first resolution to extract components in the higher frequency band than the frequency corresponding to the second resolution and then down-converting the edge detection signal obtained through the filtering.

Thus, edge information of the image signal having the higher resolution than that of the display device can be displayed on the display device. Specifically, edge information of the high-resolution (e.g., 4K-resolution) image signal can be displayed on the low-resolution (e.g., HD-resolution) viewfinder (display device). Thus, the user can achieve accurate focus on the imaging unit (high-resolution camera) using the edge information displayed on the low-resolution viewfinder.

In the second embodiment of the present technology, the image signal processing unit may further include a low-frequency-band-edge detection unit configured to obtain an edge detection signal having the second resolution on the basis of the image signal having the second resolution generated by the down-converter unit, and the combination unit may combine, with the image signal having the second resolution generated by the down-converter unit, a first edge detection signal being the edge detection signal having the second resolution obtained by the high-frequency-band-edge detection unit and a second edge detection signal being the edge detection signal obtained by the low-frequency-band-edge detection unit so as to obtain the image signal having the second resolution and being to be displayed. Thus, the sets of edge information in the low and high frequency bands can be simultaneously displayed on the display device. As a result, the user can achieve focus more easily.

In this case, the combination unit may combine the first and second edge detection signals with the image signal having the second resolution in such a manner that the edge information displayed based on the first edge detection signal and the edge information displayed based on the second edge detection signal can be distinguished from each other. Thus, the user can easily distinguish the displayed two sets of edge information from each other.

A method for displaying an image according to a third embodiment of the present technology includes displaying, on a display device, an image based on an image signal, first edge information based on an edge detection signal detected on the basis of components of the image signal in a lower frequency band than a predetermined frequency, and second edge information based on an edge detection signal detected on the basis of components of the image signal in a higher frequency band than the predetermined frequency in such a manner that the first edge information and the second edge information are superimposed on the image and can be distinguished from each other.

In the third embodiment of the present technology, the image based on the image signal, the first edge information, and the second edge information are displayed on the display device in such a manner that the first edge information and second edge information are superimposed on the image and can be distinguished from each other. For example, distinction between the edge information displayed based on the first edge detection signal and the edge information displayed based on the second edge detection signal may be made by a difference in one of hue, luminance, and line type. For example, the first resolution may be a 4K resolution, and the second resolution may be an HD resolution.

In this case, the first edge information is displayed based on the edge detection signal detected on the basis of components of the image signal in a frequency band equal to or lower than the predetermined frequency. The second edge information is displayed based on the edge detection signal detected on the basis of components of the image signal in a higher frequency band than the predetermined frequency. For example, the predetermined frequency may be a frequency corresponding to the resolution of the display device.

As seen above, in the third embodiment of the present technology, the image, the high-frequency-band-edge information, and the low-frequency-band-edge information are displayed on the display device in such a manner that the high-frequency-band-edge information and the low-frequency-band-edge information are superimposed on the image and can be distinguished from each other. As a result, the user can achieve focus more easily. For example, the user can achieve rough focus while looking at the displayed low-frequency-band-edge information and then achieve precise focus while looking at the displayed high-frequency-band-edge information.

According to the present technology, the display device can display edge information having the higher resolution than that of the display device. Note that the effects described in the present specification are illustrative only and not to be construed as limiting the present technology and that there may be additional effects.

BRIEF DESCRIPTION OF THE DRAWINGS

FIG. 2 is a diagram showing a Bayer array;
FIG. 10 is a diagram showing a down-conversion process in the high-frequency-band-edge detection circuit.

DETAILED DESCRIPTION OF EMBODIMENTS

Figure 1:
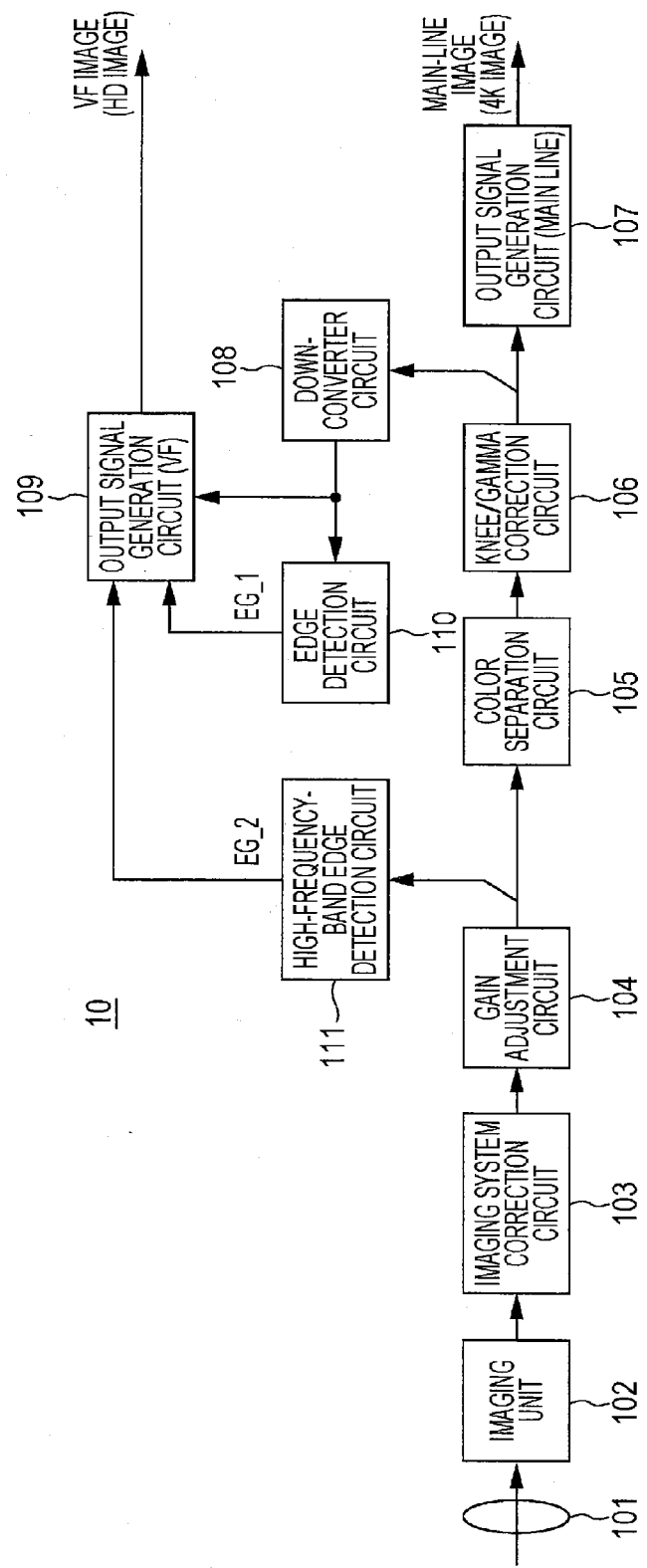
FIG. 1 is a block diagram showing an example configuration of an imaging apparatus (camera system) according to an embodiment.

Now, an embodiment of the present technology (hereafter simply referred to as the embodiment) will be described. The description will be made in the following order:
1. Embodiment
2. Modification
1. Embodiment
Example Configuration of Imaging Apparatus
FIG. 1 shows an example configuration of am imaging apparatus (camera system) 10 according to the embodiment. The imaging apparatus 10 includes a lens 101, an imaging unit 102, an imaging-system correction circuit 103, a gain adjustment circuit 104, a color separation circuit 105, a knee/gamma correction circuit 106, and an output signal generation circuit 107 of the main-line output. The imaging apparatus also includes a down-converter circuit 108, an output signal generation circuit 109 of a viewfinder, an edge detection circuit 110, and a high-frequency-band-edge detection circuit 111.

The lens 101 collects light from a subject (not shown) onto the image sensor of the imaging unit 102. The imaging unit 102 has a 4K resolution. The HD resolution is, for example, 1920 pixels wide by 1080 pixels high, whereas the 4K resolution is, for example, 3840 pixels wide by 2160 pixels high.

Figure 2:
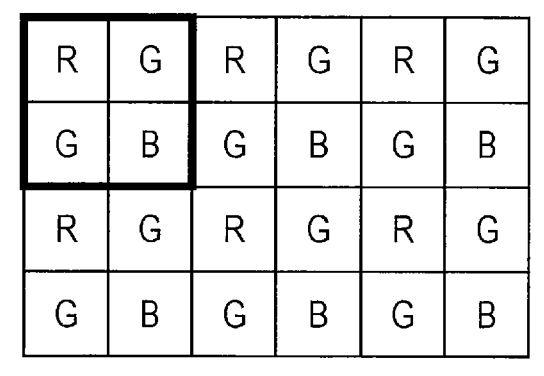

The imaging unit 102 receives the light from the subject at the image sensor thereof, performs photoelectric conversion and A/D conversion, and outputs the resulting image signals. In the present embodiment, the imaging unit 102 is a single-CCD color imaging unit including an image sensor having a Bayer color filter array. The image sensor is, for example, a solid-state image sensor such as charge coupled device (CCD) type or complementary metal oxide semiconductor (CMOS) type. FIG. 2 shows a Bayer array. In this Bayer array, 2*2 (four) pixels (one red (R) pixel, two green (G) pixels, one blue (B) pixel) surrounded by a thick frame form one set, and such sets of four pixels are arranged regularly in horizontal and vertical directions.

The imaging-system correction circuit 103 performs imaging-system correction such as shading compensation on the image signals outputted from the imaging unit 102. The gain adjustment circuit 104 gain-adjusts the image signals corrected by the imaging-system correction circuit 103. The color separation circuit 105 separates red (R), green (G), and blue (B) color signals from the image signals adjusted by the gain adjustment circuit 104.

The knee/gamma correction circuit 106 performs, on the color signals separated by the color separation circuit 105, knee correction for allowing output signals to fall within the signal standard and gamma correction for allowing the output signals to correspond to the monitor gamma. The output signal generation circuit 107 converts the color signals corrected by the knee/gamma correction circuit 106 into final output form and outputs the resulting signals as 4K main-line image signals.

The down-converter circuit 108 performs down-conversion (resolution conversion) on the color signals corrected by the knee/gamma correction circuit 106 to generate image signals (red, green, and blue color signals) having an HD resolution. The output signal generation circuit 109 converts the generated HD-resolution image signals into output form conforming to the destination, the viewfinder (display device), and outputs the resulting HD image signals to the viewfinder.

The edge detection circuit 110 obtains HD-resolution-edge detection signals from the HD-resolution image signals (red, green, and blue color signals) obtained by the down-converter circuit 108. For example, the edge detection circuit 110 performs high-pass filtering on the HD-resolution image signals on a pixel-by-pixel basis to obtain HD-resolution-edge detection signals. The edge detection circuit 110 constitutes a low-frequency-band-edge detection circuit.

The high-frequency-band-edge detection circuit 111 obtains HD-resolution-edge detection signals from the 4K-resolution image signals gain-adjusted by the gain adjustment circuit 104. Specifically, the high-frequency-band-edge detection circuit 111 performs filtering on the 4K-resolution image signals to extract components in a higher frequency band than the frequency corresponding to the HD resolution and then performs down-conversion on the resulting edge detection signals to obtain edge detection signals having the HD resolution. In this down-conversion process, edge components in resolutions exceeding the HD resolution are not lost. Details will be described later.

As described above, the output signal generation circuit 109 combines, with the HD-resolution image signals generated by the down-converter circuit 108, the edge detection signals (second edge detection signals) obtained by the edge detection circuit 110 and the edge detection signals (first edge detection signals) obtained by the high-frequency-band-edge detection circuit 111.

At this time, the output signal generation circuit 109 combines the first and second edge detection signals with the HD-resolution image signals in such a manner that edge information displayed based on the first edge detection signals and edge information displayed based on the second edge detection signals can be distinguished from each other. As used herein, the displayed edge information refers to, for example, the highlighted edge. In this case, the distinction between the edge information displayed based on the first edge detection signals and the edge information displayed based on the second edge detection signals is made, for example, by the difference in hue, luminance, line type (solid line, broken line, etc.), or the like.

The operation of the imaging apparatus 10 shown in FIG. 1 will be described briefly. Light which has passed through the lens 101 is received by the image sensor of the imaging unit 102. The imaging unit 102 then performs photoelectric conversion and A/D conversion to obtain image signals having a 4K resolution. These image signals are properly processed by the imaging-system correction circuit 103 and the gain adjustment circuit 104 and then supplied to the color separation circuit 105.

The color separation circuit 105 separates red (R), green (G), and blue (B) color signals from the image signals. The knee/gamma correction circuit 106 performs, on the separated color signals, knee correction for allowing output signals to fall within the signal standard and gamma correction for allowing the output signals to correspond to the monitor gamma and then supplies the resulting signals to the output signal generation circuit 107. The output signal generation circuit 107 converts the color signals into final output form and outputs the resulting signals as 4K main-line image signals.

The knee/gamma correction circuit 106 also supplies the corrected color signals to the down-converter circuit 108. The down-converter circuit 108 performs down-conversion (resolution conversion) on the color signals to generate image signals (red, green, and blue color signals) having an HD resolution. The down-converter circuit 108 then supplies the HD-resolution image signals to the output signal generation circuit 109. The output signal generation circuit 109 converts the HD-resolution image signals into output form conforming to the destination, the viewfinder (display device), and outputs the resulting HD image signals to the viewfinder.

The user changes the view angle or focus of the main-line image whenever necessary by manipulating the lens 101. Since the image outputted onto the viewfinder corresponds to the main-line image, the user can check a change to the view angle or focus of the main-line image in real time by checking the image outputted onto the viewfinder.

The down-converter circuit 108 also supplies the HD-resolution image signals to the edge detection circuit 110. For example, the edge detection circuit 110 performs high-pass filtering on the HD-resolution image signals on a pixel-by-pixel basis to obtain HD-resolution-edge detection signals EG_1. The edge detection circuit 110 then supplies the HD-resolution-edge detection signals EG_1 as low-frequency-band-edge detection signals to the output signal generation circuit 109.

The gain adjustment circuit 104 also supplies the gain-adjusted 4K-resolution image signals to the high-frequency-band-edge detection circuit 111. The high-frequency-band-edge detection circuit 111 performs filtering on the 4K-resolution image signals to extract components in a higher frequency band than the frequency corresponding to the HD resolution and then performs down-conversion on the resulting edge detection signals to obtain edge detection signals EG_2 having the HD resolution. The high-frequency-band-edge detection circuit 111 then supplies the HD-resolution-edge detection signals EG_2 as high-frequency-band-edge detection signals to the output signal generation circuit 109.

As described above, the output signal generation circuit 109 combines, with the HD-resolution image signals, the low-frequency-band-edge detection signals EG_1 obtained by the edge detection circuit 110 and the high-frequency-band-edge detection signals EG_2 obtained by the high-frequency-band-edge detection circuit 111 and outputs the resulting signals to the viewfinder. At this time, the combination is made in such a manner that edge information displayed (e.g., the edge highlighted) based on the low-frequency-band-edge detection signals EG_1 and edge information displayed based on the high-frequency-band-edge detection signals EG_2 can be distinguished from each other by the difference in hue, luminance, line type (solid line, broken line, etc.), or the like. Note that if the displayed low-frequency-band edge information and high-frequency-band edge information are distinguished from each other by hue, the user can preferably adjust the hue in accordance with the hue of the subject to make the color or luminance of the edge easy to see.

Figure 3:
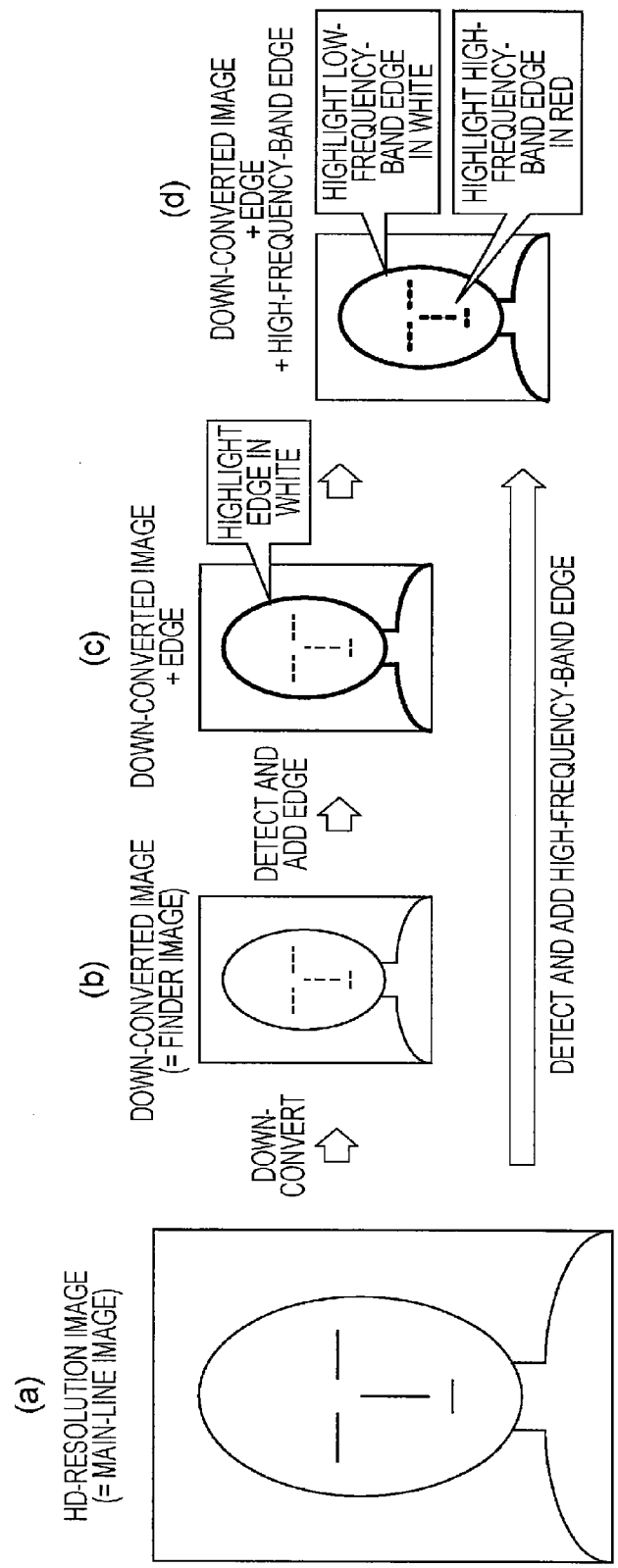
FIG. 3 is a diagram showing an example display of edge information of an image (down-converted image) on the viewfinder of the imaging apparatus.

FIG. 3 shows one example of edge information of an image (down-converted image) displayed on the viewfinder of the imaging apparatus 10 shown in FIG. 1 (e.g., the edge of the image highlighted on the viewfinder). In FIG. 3, (a) shows one example of an image based on 4K-resolution image signals as main-line output signals; (b) shows one example of an image based on HD-resolution image signals obtained by down-converting the 4K-resolution image signals; and (c) shows one example of an image when only the HD-resolution-edge detection signals EG_1 detected from the HD-resolution image signals are added to the HD-resolution image signals. For example, the low-frequency-band edge is highlighted in white.

In FIG. 3, (d) shows one example of an image when the HD-resolution-edge detection signals EG_1, as well as the HD-resolution-edge detection signals EG_2 obtained by filtering and then down-converting the 4K-resolution image signals are added to the HD-resolution image signals. For example, the low-frequency-band edge is highlighted in white, and the high-frequency-band edge is highlighted in red.

When the user attempts to achieve focus on the basis of the image displayed on the viewfinder in such a manner, for example, he or she first achieves rough focus while looking at the white-colored, low-frequency-band edge and then achieves precise focus by using the red-colored, high-frequency-band edge as an indicator. Thus, the user can easily bring the 4K-resolution image into sharp focus by simply bringing the HD-resolution image displayed on the viewfinder into focus.

Example Configuration of High-Frequency-Band-Edge Detection Circuit

Figure 4:
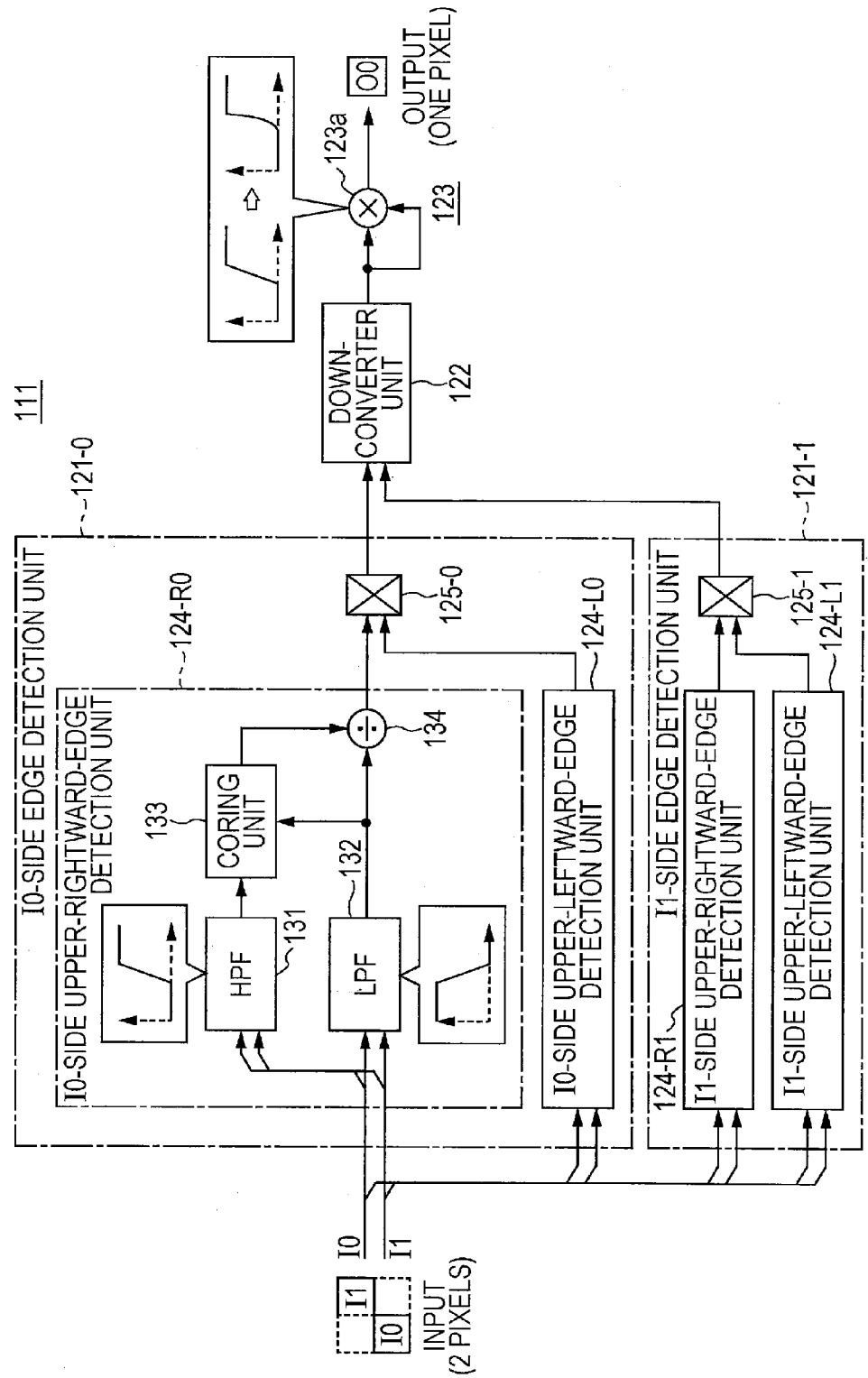
FIG. 4 is a block diagram showing an example configuration of a high-frequency-band-edge detection circuit.

FIG. 4 shows an example configuration of the high-frequency-band-edge detection circuit 111. The high-frequency-band-edge detection circuit 111 receives the 4K-resolution image signals generated by the imaging unit 102, which is a single-CCD color imaging unit including an image sensor having a Bayer color filter array. The high-frequency-band-edge detection circuit 111 obtains HD-resolution-edge detection signals EG_2 from green (G) pixel signals included in these image signals.

Here, a set of 2*2 (4) pixels (one red (R) pixel, two green (G) pixels, one blue (B) pixel) (see the thick frame in FIG. 2) in the Bayer array is noted, and the lower-left green (G) pixel and the upper-right green (G) pixel are defined as I0 and I1, respectively.

The high-frequency-band-edge detection circuit 111 includes an I0-side edge detection unit 121-0, an I1-side edge detection unit 121-1, a down-converter unit 122, and a squaring unit 123. The I0-side edge detection unit 121-0 obtains an edge detection signal corresponding to the pixel I0 of each set of four pixels in the Bayer array on the basis of signals (G signals) of the pixels I0 and I1 of adjacent sets of four pixels. Similarly, the I1-side edge detection unit 121-1 obtains an edge detection signal corresponding to the pixel I1 of each set of four pixels in the Bayer array on the basis of signals (G signals) of the pixels I0 and I1 of adjacent sets of four pixels.

The I0-side edge detection unit 121-0 includes an I0-side upper-rightward-edge detection unit 124-R0, an I0-side upper-leftward-edge detection unit 124-L0, and a selector 125-0. The I0-side upper-rightward-edge detection unit 124-R0 includes a high-pass filter 131, a low-pass filter 132, a coring unit 133, and a dividing unit 134.

The high-pass filter 131 detects I0-side, upper-rightward, high-frequency-band signals (edge detection signals). Assuming that the resolution limit (Nyquist frequency) of the main-line image is 1, the resolution limit of the finder image obtained by performing down-conversion at a 2:1 ratio is 0.5. High-frequency-band signals (edge detection signals) desired to detect using the high-pass filter 131 are present in a high frequency band which is included in the main-line image alone, not in the finder image.

Figure 5:
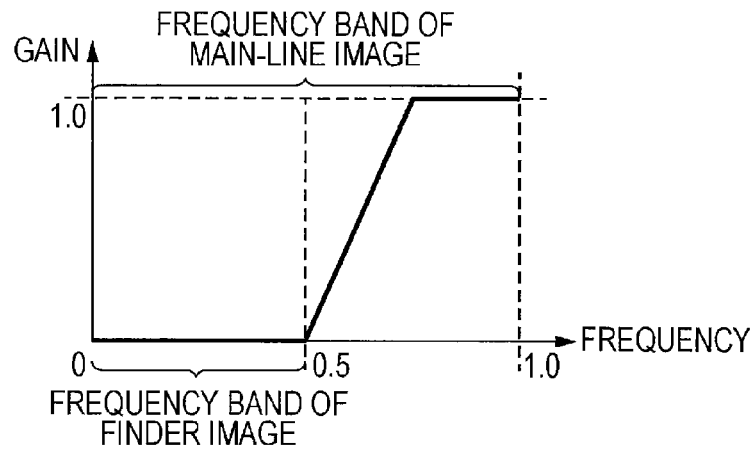
FIG. 5 is a diagram showing characteristics of a high-pass filter.

For this reason, the high-pass filter 131 preferably has characteristics where the gain is 0 in a frequency band of 0.5 or less and 1 in a frequency band higher than 0.5, as shown in FIG. 5. The frequency band of 0.5 or less is a frequency band in which the finder output image lies, and can be detected by the edge detection circuit 110. Accordingly, the high-frequency-band-edge detection circuit 111 does not have to detect that frequency band twice. If the high-pass filter 131 is a high-pass filter which responds to even an edge having a frequency of 0.5 or less, it would detect such an edge even when the main-line output has yet to be brought into focus, preventing the main-line output from being brought into sharp focus.

Note that by changing the characteristic (filter coefficient) of the high-pass filter 131, the frequency band to be detected can be changed. For example, when the subject moves, the edge falls into a lower frequency band. In this case, by replacing the high-pass filter with a filter which responds to even the lower frequency band (a filter having a lower cutoff frequency), even such an edge can be detected.

Generally, when a single-CCD color imaging unit including an image sensor having a Bayer color filter array is used, diagonally arranged green (G) pixels alone have a resolution equivalent to that of the main-line image. For this reason, high-pass filter 131 performs high-pass filtering on each set of four pixels in the Bayer array while regarding the pixel I0 as the pixel of interest and using, as tap-inputs, signals (G signals) of a predetermined number of pixels I0 and I1 arranged upper-rightward. Thus, the high-pass filter 131 detects high-frequency-band signals (edge detection signals).

Figure 6:
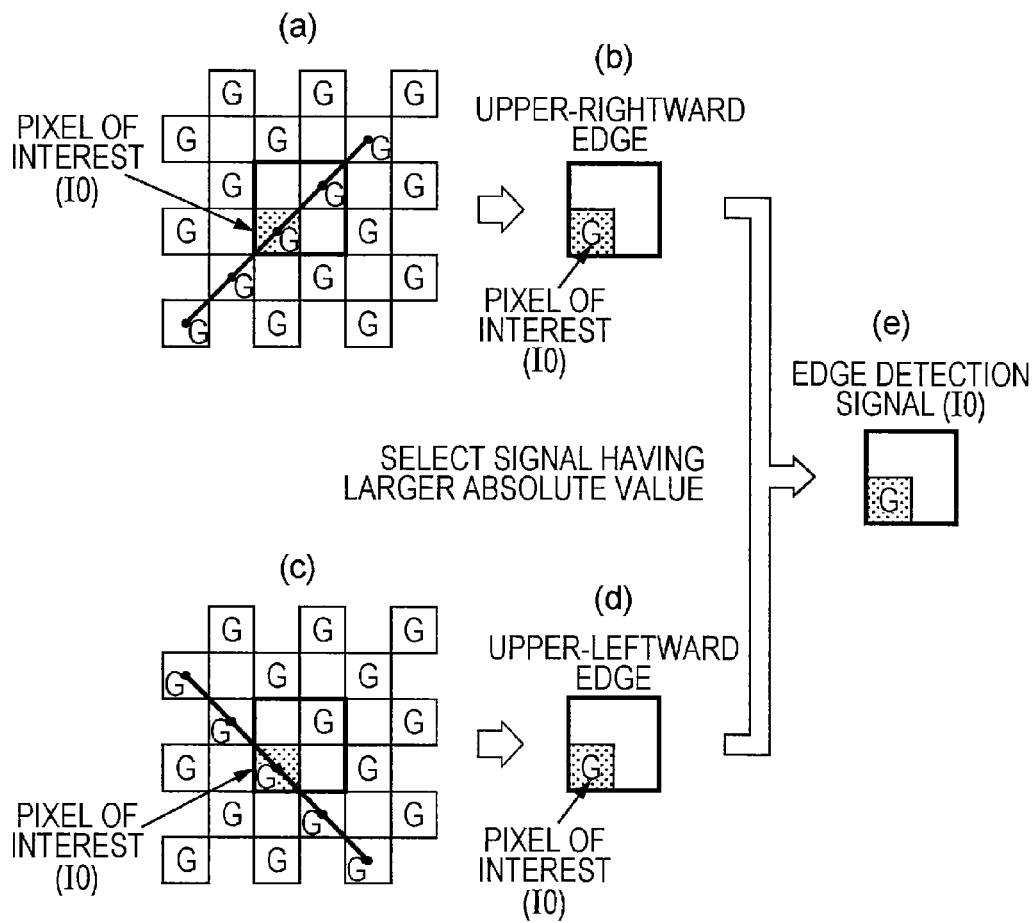
FIG. 6 is a diagram showing an I0-side edge detection process in the high-frequency-band-edge detection circuit.

In FIG. 6, (a) shows one example of the predetermined number of pixels I0 and I1 which are used as tap inputs and arranged upper-rightward. In this example, signals (G signals) of five pixels including the pixel of interest, two pixels preceding the pixel of interest, and two pixels following the pixel of interest are used. As shown in (b) of FIG. 6, an edge detection signal in an upper-right direction of the pixel of interest (pixel I0) is obtained from the predetermined number of upper-rightward-arranged pixels I0 and I1.

When the high-pass filter 131 detects a high-frequency-band signal (edge detection signal) of the pixel of interest (pixel I0) for each set of four pixels in the Bayer array, the low-pass filter 132 obtains the average of the signal levels of pixels adjacent to the pixel of interest (pixel I0). For example, the low-pass filter 132 performs low-pass filtering using, as a tap input, signals (G signals) of the predetermined number of upper-rightward-arranged pixels I0 and I1 including the pixel of interest (pixel I0) and then detects the average of the signal levels.

The coring unit 133 receives the high-frequency-band signal detected by the high-pass filter 131, suppresses noise in the signal, and outputs the resulting signal. Since the high-pass filter 131 responds to the edge, as well as to high-frequency random noise, the high-frequency-band signal (edge detection signal) detected by the high-pass filter 131 also includes the high-frequency random noise. For this reason, when the coring unit 133 receives a signal having an amplitude smaller than a predetermined value, it regards the signal as containing noise components and then suppresses the noise components. Specifically, the level of an output signal, Y, is given by Formula (1) below;

$$Y = \begin{cases} X - \text{CORE\_LEVEL}, & \text{if}(X \geq \text{CORE\_LEVEL}) \\ 0, & \text{if}(-\text{CORE\_LEVEL} < X < \text{CORE\_LEVEL}) \\ X + \text{CORE\_LEVEL}, & \text{otherwise} \end{cases} \quad (1)$$

where X represents the level of the received signal; and CORE_LEVEL represents the coring level.

Figure 7:
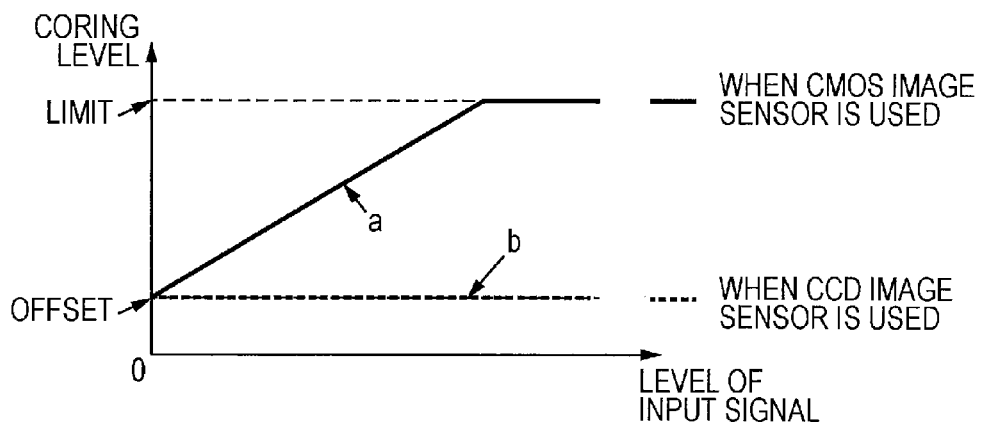
FIG. 7 is a diagram showing the coring levels of CMOS and CCD image sensors.

It is known that if the image sensor of the imaging unit 102 is a CMOS image sensor, the noise amount depends on the signal level, that is, the noise amplitude increases as the signal amplitude increases. For this reason, as shown by a solid line a in FIG. 7, the coring unit 133 increases the coring level in accordance with the signal level. In this case, the coring unit 133 uses, for example, the average of the signal levels of adjacent pixels obtained by the low-pass filter 132 as a reference signal level. In contrast, it is known that if the image sensor of the imaging unit 102 is a CCD imaging sensor, the noise amount does not depend on the signal level. For this reason, as shown by a broken line b in FIG. 7, the coring unit 133 keeps the coring level constant, regardless of the signal level.

The dividing unit 134 normalizes the high-frequency-band signal (edge detection signal) noise-suppressed by the coring unit 133 by dividing the signal by the average of the signal levels of adjacent signals obtained by the low-pass filter 132.

Generally, when a natural image is captured, the amount of spatial variation increases as the signal level increases (bright); the amount of spatial variation decreases as the signal level decreases (dark). Accordingly, the output of the high-pass filter 131 tends to become a large value in a bright area; it tends to become a small value in a dark area. In other words, the edge tends to be falsely detected in a bright area; the edge is difficult to detect in a dark area.

To improve such tendencies, the dividing unit 134 performs the above normalization process. More specifically, the dividing unit 134 normalizes the output value of the high-pass filter 131 to a small value in a bright area, where the output of the low-pass filter 132 becomes a large value; it normalizes the output value of the high-pass filter 131 to a large value in a dark area, where the output of the low-pass filter 132 becomes a small value. Since the dividing unit 134 performs the normalization process in this manner, false detection of the edge in a bright area is reduced, and detection of the edge in a dark area is facilitated.

The I0-side upper-leftward-edge detection unit 124-L0 has a similar structure to that of the I0-side upper-rightward-edge detection unit 124-R0 and detects I0-side, upper-leftward, high-frequency-band signals (edge detection signals). A high-pass filter included in the I0-side upper-leftward-edge detection unit 124-L0 performs high-pass filtering on each set of four pixels in the Bayer array while regarding the pixel I0 as the pixel of interest and regarding, as a tap input, signals (G signals) of a predetermined number of upper-leftward-arranged pixels I0 and I1 to detect high-frequency-band signals (edge detection signals).

In FIG. 6, (c) shows one example of the predetermined number of pixels I0 and I1 which are used as a tap input and arranged upper-leftward. In this example, signals (G signals) of five pixels including the pixel of interest, two pixels preceding the pixel of interest, and two pixels following the pixel of interest are used. As shown in (d) of FIG. 6, an edge detection signal in an upper-left direction of the pixel of interest (pixel I0) is obtained from the predetermined number of upper-leftward-arranged pixels I0 and I1.

The selector 125-0 selects a signal having a larger absolute value from between the edge detection signal in the upper-right direction of the pixel of interest (pixel I0) detected by the I0-side upper-rightward-edge detection unit 124-R0 and the edge detection signal in the upper-left direction of the pixel of interest (pixel I0) detected by the I0-side upper-leftward-edge detection unit 124-L0. The selector 125-0 then outputs the selected signal as an edge detection signal of the I0-side edge detection unit 121-0, that is, as an edge detection signal corresponding to the pixel I0.

The I1-side edge detection unit 121-1 includes an I1-side upper-rightward-edge detection unit 124-R1, an I1-side upper-leftward-edge detection unit 124-L1, and a selector 125-1. The I1-side upper-rightward-edge detection unit 124-R1 has a similar configuration to that of the I0-side upper-rightward-edge detection unit 124-R0 and detects I1-side, upper-rightward, high-frequency-band signals (edge detection signals). A high-pass filter included in the I1-side upper-rightward-edge detection unit 124-R1 performs high-pass filtering on each set of four pixels in the Bayer array while regarding the pixel I1 as the pixel of interest and regarding, as a tap input, signals (G signals) of a predetermined number of upper-rightward-arranged pixels I0 and I1. Thus, the high-pass filter detects high-frequency-band signals (edge detection signals).

Figure 8:
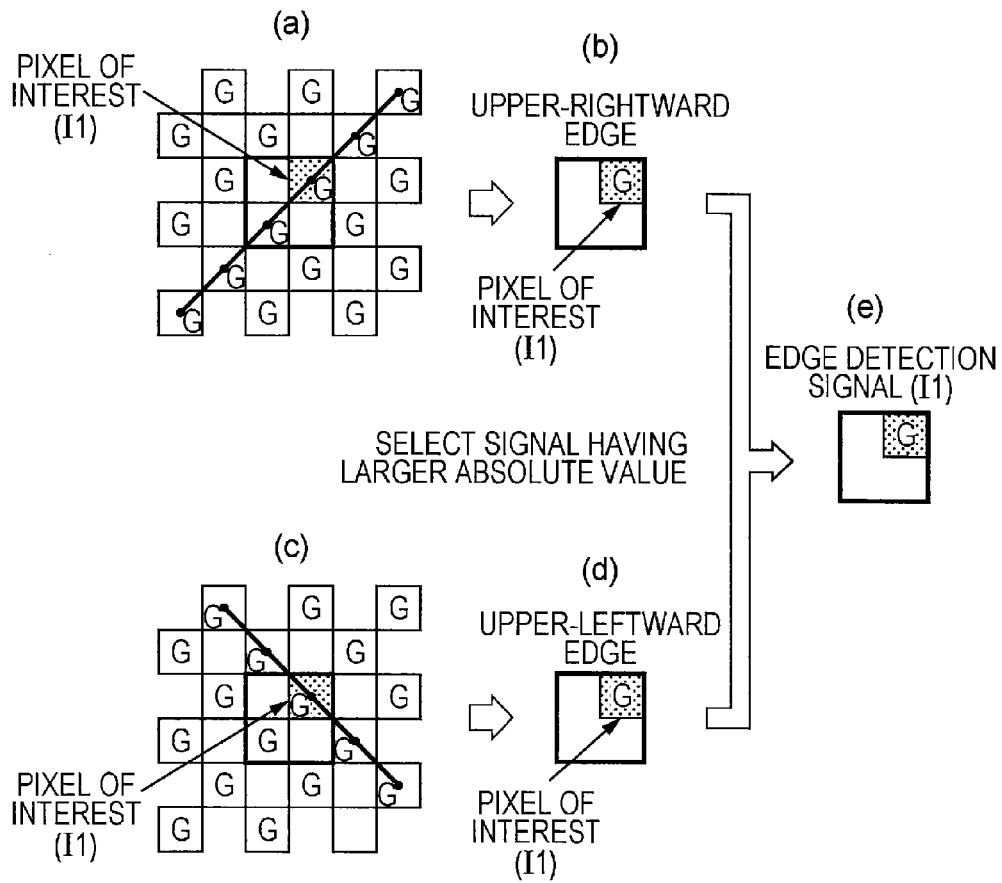
FIG. 8 is a diagram showing an I1-side edge detection process in the high-frequency-band-edge detection circuit.

In FIG. 8, (a) shows one example of the predetermined number of pixels I0 and I1 which are used as a tap input and arranged upper-rightward. In this example, signals (G signals) of five pixels including the pixel of interest, two pixels preceding the pixel of interest, and two pixels following the pixel of interest are used. As shown in (b) of FIG. 8, an edge detection signal in an upper-right direction of the pixel of interest (pixel I1) is obtained from the predetermined number of upper-rightward-arranged pixels I0 and I1.

The I1-side upper-leftward-edge detection unit 124-L1 has a similar configuration to that of the I0-side upper-leftward-edge detection unit 124-L0 and detects I1-side, upper-leftward, high-frequency-band signals (edge detection signals). A high-pass filter included in the I1-side upper-leftward-edge detection unit 124-L1 performs high-pass filtering on each set of four pixels in the Bayer array while regarding the pixel I1 as the pixel of interest and regarding, as a tap input, signals of a predetermined number of upper-leftward-arranged pixels I0 and I1 to detect high-frequency-band signals (edge detection signals).

In FIG. 8, (c) shows one example of the predetermined number of pixels I0 and I1 which are used as a tap input and arranged upper-leftward. In this example, signals (G signals) of five pixels including the pixel of interest, two pixels preceding the pixel of interest, and two pixels following the pixel of interest are used. As shown in (d) of FIG. 8, an edge detection signal in an upper-left direction of the pixel of interest (pixel I1) is obtained from the predetermined number of upper-leftward-arranged pixels I0 and I1.

The selector 125-1 selects a signal having a larger absolute value from between the edge detection signal in the upper-right direction of the pixel of interest (pixel I1) detected by the I1-side upper-rightward-edge detection unit 124-R1 and the edge detection signal in the upper-left direction of the pixel of interest (pixel I1) detected by the I1-side upper-leftward-edge detection unit 124-L1. The selector 125-1 then outputs the selected signal as an edge detection signal of the I1-side edge detection unit 121-1, that is, as an edge detection signal corresponding to the pixel I1.

The down-converter unit 122 performs down-conversion on the edge detection signals corresponding to the pixels I0 and I1 detected by the edge detection units 121-0 and 121-1 to obtain HD-resolution-edge detection signals.

Figure 9:
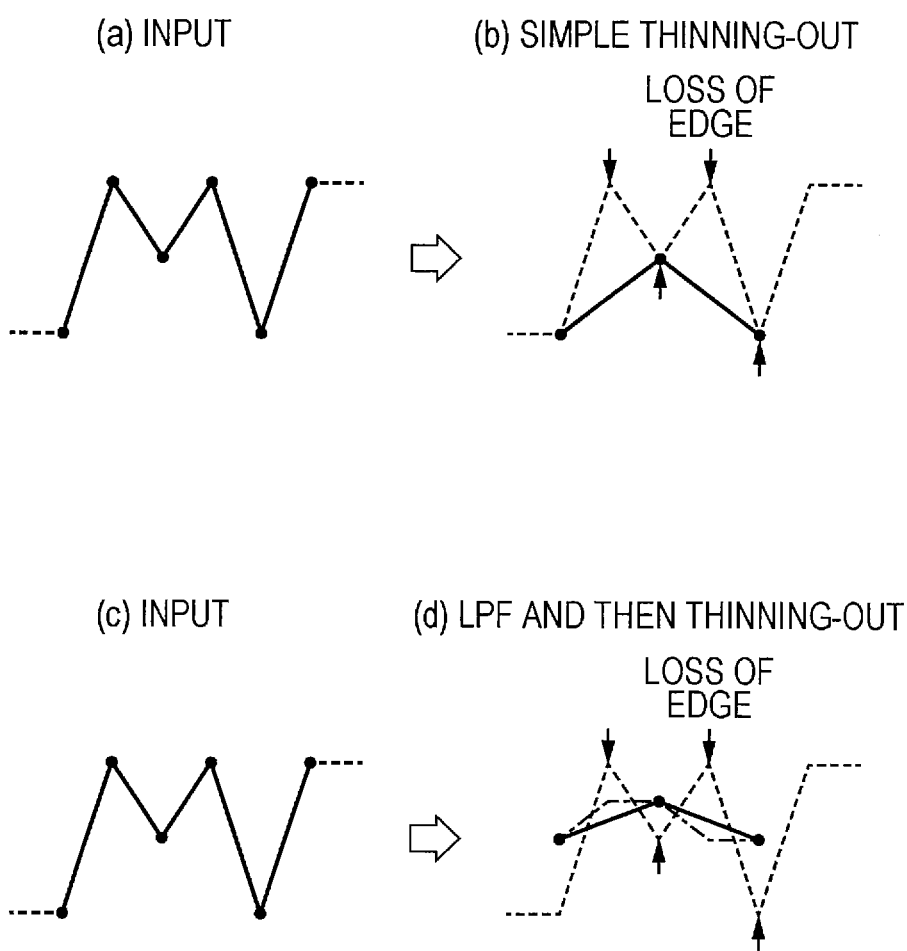
FIG. 9 is a diagram showing edge loss caused by simple thinning-out and edge loss caused by application of band limitation and subsequent thinning-out.

Typically, down-conversion refers to a process of thinning out the pixels by "the number of input pixels minus the number of output pixels" using some method. For example, by simply thinning out the pixels every other pixel, 2:1-ratio down-conversion can be accomplished. For example, an input shown in (a) of FIG. 9 is simply thinned out as shown in (b) of FIG. 9. Thus, however, edge information present in the phase where thinning-out is performed is lost (a high-frequency-band signal is folded in a low band).

In a typical down-conversion process, band limitation is applied by a low-pass filter (LPF) to suppress aliasing and then thinning-out is performed. For example, an input shown in (c) of FIG. 9 is subjected to band limitation and then thinning-out, as shown in (d) of FIG. 9. However, edge information present in a high frequency band is lost through this process.

The down-converter unit 122 performs down-conversion without causing loss of high-resolution-edge components. The down-converter unit 122 down-converts the 4K resolution into an HD resolution at a 2:1 ratio. The down-converter unit 122 handles, as one series of signals, edge detection signals corresponding to the pixels I0 and I1 of each set of four pixels horizontally arranged in the Bayer array and performs the following process on the set of four pixels.

First, the down-converter unit 122 divides the one series of signals into units of 2*2 pixels. Then, the down-converter unit 122 generates continuous 2*2 sets of two pixels from edge detection signals corresponding to 2*2 pixels of each division unit and the first pixel of a division unit following the division unit, the 2*2 pixels and the first pixel being continuous. Finally, the down-converter unit 122 extracts, from the 2*2 sets, a set of two pixels having the largest absolute difference.

In FIG. 10, (a1) shows pixels I0 and I1 (shown by "G") of sets of four pixels horizontally arranged in a Bayer array. (a2) of FIG. 10 shows level changes in a series of signals formed by sequentially arranging edge detection signals corresponding to the pixels I0 and I1.

(a3) of FIG. 10 shows that the one series of signals is divided into units of 2*2 pixels and that continuous 2*2 sets of two pixels are generated from edge detection signals corresponding to 2*2 pixels of each division unit and the first pixel of a division unit following the division unit, the 2*2 pixels and the first pixel being continuous. For example, units of four pixels "I0-1, I1-1, I0-2, I1-2" and "I0-3, I1-3, I0-4, I1-4" each constitute a division unit. For the division unit "I0-1, I1-1, I0-2, I1-2", four sets of two pixels "I0-1, I1-1", "I1-1, I0-2", "I0-2, I1-2", and "I1-2, I0-3" are formed; for the division unit "I0-3, I1-3, I0-4, I1-4", four sets of two pixels "I0-3, I1-3", "I1-3, I0-4", "I0-4, I1-4", and "I1-4, I0-5" are formed.

(b1) of FIG. 10 shows down-converted, horizontally arranged pixels (shown by "G"). (b2) of FIG. 10 shows level changes in edge detection signals corresponding to the down-converted pixels. As shown in (b3) of FIG. 10, for the division unit "I0-1, I1-1, I0-2, I1-2", a set of two pixels (I1-2, I0-3) having the largest absolute difference is selected, and "I1-2" and "I0-3" are outputted in this order. For the division unit "I0-3, I1-3, I0-4, I1-4", a set of two pixels (I0-4, I1-4) having the largest absolute difference is selected, and "I0-4" and "I1-3" are outputted in this order.

In the above down-conversion process, a 2*2-pixel input produces a two-pixel output, meaning that 2:1 down-conversion is performed. Further, in this down-conversion process, an edge detection signal having the largest amount of change is outputted as it is. Thus, the 4K-resolution edge is stored in the down-converted signals as it is.

Referring back to FIG. 4, the squaring unit 123 squares the HD-resolution-edge detection signals generated by the down-converter unit 122 using a multiplier 123a and outputs the resulting signals. Through this squaring process, it is possible to put the gain obtained by the high-pass filter 131 into a form like a quadratic function and thus to emphasize signals in a narrower band.

The operation of the high-frequency-band-edge detection circuit 111 shown in FIG. 4 will be described briefly. The I0-side upper-rightward-edge detection unit 124-R0 obtains an edge detection signal (high-frequency-band signal) in an upper-right direction of the pixel of interest (pixel I0) for each set of four pixels in the Bayer array (see the thick frame in FIG. 2) on the basis of signals (G signals) of the pixels I0 and I1 of adjacent sets of four pixels (see (a) and (b) in FIG. 6). The I0-side upper-leftward-edge detection unit 124-L0 detects an edge detection signal (high-frequency-band signal) in an upper-left direction of the pixel of interest (pixel I0) for each set of four pixels in the Bayer array on the basis of signals (G signals) of the pixels I0 and I1 of adjacent sets of four pixels (see (c) and (d) in FIG. 6).

The I0-side upper-rightward-edge detection unit 124-R0 then supplies the obtained edge detection signal in the upper-right direction of the pixel I0 to the selector 125-0. Similarly, the I0-side upper-leftward-edge detection unit 124-L0 supplies the obtained edge detection signal in the upper-left direction of the pixel I0 to the selector 125-0. The selector 125-0 selects a signal having a larger absolute value from between the two edge detection signals and outputs the selected signal as an edge detection signal of the I0-side edge detection unit 121-0, that is, as an edge detection signal corresponding to the pixel I0 (see (e) of FIG. 6).

The I1-side upper-rightward-edge detection unit 124-R1 obtains an edge detection signal (high-frequency-band signal) in an upper-right direction of the pixel of interest (pixel I1) for each set of four pixels in the Bayer array (see the thick frame in FIG. 2) on the basis of signals (G signals) of the pixels I0 and I1 of adjacent sets of four pixels (see (a) and (b) of FIG. 8). The I1-side upper-leftward-edge detection unit 124-L1 detects an edge detection signal (high-frequency-band signal) in an upper-left direction of the pixel of interest (pixel I1) for each set of four pixels in the Bayer array on the basis of the signals (G signals) of the pixels I0 and I1 of adjacent sets of four pixels (see (c) and (d) of FIG. 8).

The I1-side upper-rightward-edge detection unit 124-R1 then supplies the obtained edge detection signal in the upper-right direction of the pixel I1 to the selector 125-1.

Similarly, the I1-side upper-leftward-edge detection unit 124-L1 supplies the obtained edge detection signal in the upper-left direction of the pixel I1 to the selector 125-1. The selector 125-1 selects a signal having a larger absolute value from between the two edge detection signals and outputs the selected signal as an edge detection signal of the I1-side edge detection unit 121-1, that is, as an edge detection signal corresponding to the pixel I1 (see (e) of FIG. 8).

The I0-side edge detection unit 121-0 and I1-side edge detection unit 121-1 then output, to the down-converter unit 122, the edge detection signal corresponding to the pixel I0 and the edge detection signal corresponding to the pixel I1, respectively. The down-converter unit 122 down-converts the edge detection signals corresponding to the pixels I0 and I1, that is, the 4K-resolution-edge detection signals into HD-resolution-edge detection signals.

At this time, the down-converter unit 122 performs the down-conversion without causing loss of the high-resolution-edge components (see FIG. 10). For example, the down-converter unit 122 handles, as one series of signals, edge detection signals corresponding to the pixels I0 and I1 of sets of four pixels horizontally arranged in the Bayer array and divides the one series of signals into units of 2*2 pixels. The down-converter unit 122 then generates continuous 2*2 sets of two pixels from edge detection signals corresponding to 2*2 pixels of each division unit and the first pixel of a division unit following the division unit, the 2*2 pixels and the first pixel being continuous. The down-converter unit 122 then extracts, from the 2*2 sets, a set of two pixels having the largest absolute difference.

The down-converter unit 122 then supplies the generated HD-resolution-edge detection signals to the squaring unit 123. The squaring unit 123 squares the HD-resolution-edge detection signals. Then the high-frequency-band-edge detection circuit 111 outputs the resulting signal.

The high-frequency-band-edge detection circuit 111 receives two pixels "I0, I1" and outputs one pixel "O0", that is, obtains edge detection signals at a 2:1 ratio. That is, the high-frequency-band-edge detection circuit 111 obtains HD-resolution-edge detection signals EG_2 from the 4K-resolution image signals.

As described above, the imaging apparatus 10 combines, with the HD-resolution image signals, the low-frequency-band-edge detection signals EG_1 obtained by the edge detection circuit 110 and the high-frequency-band-edge detection signals EG_2 obtained by the high-frequency-band-edge detection circuit 111 and then outputs the resulting signals to the viewfinder. Thus, not only HD-resolution edge information but also 4K-resolution edge information can be displayed on the HD-resolution viewfinder. As a result, the user can achieve accurate focus on the 4K-resolution camera using the edge information displayed on the HD-resolution viewfinder.

Further, the imaging apparatus 10 shown in FIG. 1 combines the edge detection signals EG_1 and EG_2 in the low and high frequency bands with the HD-resolution image signals in such a manner that edge information displayed (e.g., the edge highlighted) based on the low-frequency-band-edge detection signals EG_1 and edge information displayed based on the high-frequency-band-edge detection signals EG_2 can be distinguished from each other by the difference in hue, luminance, line type (solid line, broken line, etc.), or the like.

Thus, the sets of edge information in the low and high frequency bands can be simultaneously displayed (e.g., the edges in those frequency bands can be simultaneously highlighted). As a result, the user can achieve focus more easily. For example, the user can achieve rough focus while looking at the displayed HD-resolution edge information and then achieve precise focus while looking at the displayed 4K-resolution edge information. At this time, the two sets of edge information are displayed in such a manner that the user can easily distinguish them from each other.

Further, the imaging apparatus 10 shown in FIG. 1 filters and then down-converts the 4K-resolution image signals to obtain HD-resolution-edge detection signals EG_2. In this down-conversion process, an edge detection signal having the largest amount of change is outputted as it is. Thus, the 4K-resolution edge is stored in the down-converted signals as it is, allowing the 4K-resolution edge information to be favorably displayed on the HD-resolution viewfinder.

2. Modification

In the above embodiment, it is assumed that the imaging resolution is 4K and that the display resolution of the viewfinder is HD. For this reason, the down-converter unit 122 of the high-frequency-band-edge detection circuit 111 performs down-conversion at a 2:1 ratio. If the ratio of the imaging resolution to the display resolution of the viewfinder is, for example, N:1 (N is an integer of 2 or more), the high-frequency-band-edge detection circuit 111 performs down-conversion at an N:1 ratio.

In this case, the down-converter unit 122 handles, as one series of signals, edge detection signals corresponding to the pixels I0 and I1 of each set of four pixels horizontally arranged in the Bayer array and performs, for example, the following process. First, the down-converter unit 122 divides the one series of signals into units of 2*N pixels. Then, the down-converter unit 122 generates continuous 2*N sets of two pixels from edge detection signals corresponding to 2*N pixels of each division unit and the first pixel of a division unit following the division unit, the 2*N pixels and the first pixel being continuous. Finally, the down-converter unit 122 extracts, from the 2*N sets, a set of two pixels having the largest absolute difference. In this down-conversion process, the down-converter unit 122 receives 2*N pixels and outputs two pixels, meaning that it performs N:1 down-conversion.

The ratio of the imaging resolution to the display resolution of the viewfinder may be N:M (N and M are relatively prime). In this case, the down-converter unit 122 handles, as one series of signals, edge detection signals corresponding to the pixels I0 and I1 of each set of four pixels horizontally arranged in the Bayer array and performs, for example, the following process. First, the down-converter unit 122 divides the one series of signals into units of N pixels. Then, the down-converter unit 122 generates continuous N sets of M pixels from edge detection signals corresponding to N pixels of each division unit and the first M−1 pixels of the following division unit, the N pixels and the first M−1 pixels being continuous. Finally, the down-converter unit 122 extracts, from the N sets, a set of M pixels having the largest sum of adjacent pixel absolute differences. In this down-conversion process, the down-converter unit 122 receives N pixels and outputs M pixels, meaning that it performs N:M down-conversion.

In the above embodiment, the HD-resolution edge information and the 4K-resolution edge information, that is, the sets of edge information in the two frequency bands are simultaneously displayed on the HD-resolution viewfinder. However, sets of edge information in three or more frequency bands may be displayed simultaneously. For example, assuming that the imaging resolution is 8K and that the display resolution of the viewfinder is HD, it is possible to simultaneously display HD-resolution edge information, 4K-resolution edge information, and 8K-resolution edge information, that is, sets of edge information in three frequency bands using a similar configuration to the above embodiment.

In the above embodiment, the imaging unit 102 is a single-CCD color imaging unit including an image sensor having a Bayer color filter array. However, the imaging unit 102 may be a color imaging unit including 3 CODs for red (R), green (G), and blue (B). Of course, the present technology is applicable to such an imaging unit as well.

For example, the high-frequency-band-edge detection circuit 111 performs high-pass filtering on each pixel in two directions (horizontal and vertical directions) to obtain edge detection signals and then selects the edge detection signal having a larger absolute value as the edge detection signal of the pixel. The high-frequency-band-edge detection circuit 111 then down-converts the edge detection signals of the pixels in two directions (horizontal and vertical directions) at the above N:1 or N:M ratio.

The present technology may be configured as follows.

(1) An image signal processing apparatus including: a down-converter unit configured to down-convert an image signal having a first resolution into an image signal having a second resolution lower than the first resolution; a high-frequency-band-edge detection unit configured to perform filtering on the image signal having the first resolution to extract components in a higher frequency band than a frequency corresponding to the second resolution and to perform down-conversion on an edge detection signal obtained through the filtering to obtain an edge detection signal having the second resolution; and a combination unit configured to combine, with the image signal having the second resolution generated by the down-converter unit, the edge detection signal having the second resolution obtained by the high-frequency-band-edge detection unit so as to obtain an image signal having the second resolution and being to be displayed.

(2) The image signal processing apparatus according to the above (1), wherein assuming that a down-conversion ratio is N:1, N being an integer of 2 or more, the down-conversion performed by the high-frequency-band-edge detection unit includes dividing the edge detection signal obtained through the filtering into units of 2N pixels, generating continuous 2N sets of two pixels from edge detection signals corresponding to 2N pixels of each division unit and the first pixel of a division unit following the division unit, the 2N pixels and the first pixel being continuous, and extracting, from the 2N sets, a set of two pixels having the largest absolute difference.

(3) The image signal processing apparatus according to the above (1) or (2), wherein the high-frequency-band-edge detection unit normalizes the edge detection signal obtained through the filtering by dividing the edge detection signal by an average of levels of the image signal having the first resolution and then performs the down-conversion on the normalized edge detection signal.

(4) The image signal processing apparatus according to any one of the above (1) to (3), further including a low-frequency-band-edge detection unit configured to obtain an edge detection signal having the second resolution on the basis of the image signal having the second resolution generated by the down-converter unit, wherein the combination unit combines, with the image signal having the second resolution generated by the down-converter unit, a first edge detection signal being the edge detection signal having the second resolution obtained by the high-frequency-band-edge detection unit and a second edge detection signal being the edge detection signal obtained by the low-frequency-band-edge detection unit so as to obtain the image signal having the second resolution and being to be displayed.

(5) The image signal processing apparatus according to the above (4), wherein the combination unit combines the first and second edge detection signals with the image signal having the second resolution in such a manner that edge information displayed based on the first edge detection signal and edge information displayed based on the second edge detection signal can be distinguished from each other.

(6) The image signal processing apparatus according to the above (5), wherein distinction between the edge information displayed based on the first edge detection signal and the edge information displayed based on the second edge detection signal is made by a difference in one of hue, luminance, and line type.

(7) The image signal processing apparatus according to any one of the (1) to (6), wherein the image signal having the first resolution is an image signal outputted from a single-CCD color imaging unit including an image sensor having a Bayer color filter array and wherein the high-frequency-band-edge detection unit obtains the edge detection signal having the second resolution on the basis of signals of diagonally arranged green pixels.

(8) The image signal processing apparatus according to any one of the (1) to (7), wherein the first resolution is a 4K resolution and wherein the second resolution is an HD resolution.

(9) A method for processing an image signal, including: down-converting an image signal having a first resolution into an image signal having a second resolution lower than the first resolution; performing filtering on the image signal having the first resolution to extract components in a higher frequency band than a frequency corresponding to the second resolution and down-converting an edge detection signal obtained through the filtering into an edge detection signal having the second resolution; and combining the edge detection signal having the second resolution with the image signal having the second resolution so as to obtain an image signal having the second resolution and being to be displayed.

(10) An imaging apparatus including: an imaging unit configured to obtain an image signal having a first resolution; and an image signal processing unit configured to process the image signal having the first resolution obtained by the imaging unit to obtain an image signal having a second resolution lower than the first resolution and being to be displayed on a viewfinder, wherein the image signal processing unit includes a down-converter unit configured to down-convert the image signal having the first resolution into an image signal having the second resolution, a high-frequency-band-edge detection unit configured to perform filtering on the image signal having the first resolution to extract components in a higher frequency band than a frequency corresponding to the second resolution and to down-convert an edge detection signal obtained through the filtering into an edge detection signal having the second resolution, and a combination unit configured to combine the edge detection signal having the second resolution obtained by the high-frequency-band-edge detection unit with the image signal having the second resolution generated by the down-converter unit so as to obtain an image signal having the second resolution and being to be displayed.

(11) The imaging apparatus according to the above (10), wherein the image signal processing unit further includes a low-frequency-band-edge detection unit configured to obtain an edge detection signal having the second resolution on the basis of the image signal having the second resolution generated by the down-converter unit, and wherein the combination unit combines, with the image signal having the second resolution generated by the down-converter unit, a first edge detection signal being the edge detection signal having the second resolution obtained by the high-frequency-band-edge detection unit and a second edge detection signal being the edge detection signal obtained by the low-frequency-band-edge detection unit so as to obtain the image signal having the second resolution and being to be displayed.

(12) The imaging apparatus according to the above (11), wherein the combination unit combines the first and second edge detection signals with the image signal having the second resolution in such a manner that edge information displayed based on the first edge detection signal and edge information displayed based on the second edge detection signal can be distinguished from each other.

(13) The imaging apparatus according to any one of the (10) to (12), wherein the first resolution is a 4K resolution and wherein the second resolution is an HD resolution.

(14) A method for displaying an image, including displaying, on a display device, an image based on an image signal, first edge information based on an edge detection signal detected on the basis of components of the image signal in a lower frequency band than a predetermined frequency, and second edge information based on an edge detection signal detected on the basis of components of the image signal in a higher frequency band than the predetermined frequency in such a manner that the first edge information and the second edge information are superimposed on the image and can be distinguished from each other.

(15) The method for displaying an image according to the above (14), wherein distinction between the displayed first edge information and the displayed second edge information is made by a difference in one of hue, luminance, and line type.

(16) The method for displaying an image according to the (14) or (15), wherein the predetermined frequency is a frequency corresponding to a resolution of the display device.

(17) The method for displaying an image according to any one of the (14) to (16), wherein the image signal is an image signal outputted from an imaging unit having a 4K resolution and wherein the display device has an HD resolution.

It should be understood by those skilled in the art that various modifications, combinations, sub-combinations and alterations may occur depending on design requirements and other factors insofar as they are within the scope of the appended claims or the equivalents thereof.

What is claimed is:

1. An image signal processing apparatus comprising:
   down-converter circuitry configured to down-convert an image signal having a first resolution into an image signal having a second resolution lower than the first resolution;
   high-frequency-band-edge detection circuitry configured to perform filtering on the image signal having the first resolution to extract components in a higher frequency band than a frequency corresponding to the second resolution and to perform down-conversion on an edge detection signal obtained through the filtering to obtain an edge detection signal having the second resolution; and
   combination circuitry configured to combine the edge detection signal having the second resolution obtained by the high-frequency-band-edge detection circuitry with the image signal having the second resolution generated by the down-converter circuitry so as to obtain an image signal having the second resolution for display,
   wherein assuming that a down-conversion ratio is N:1, N being an integer of 2 or more, the down-conversion performed by the high-frequency-band-edge detection circuitry includes dividing the edge detection signal obtained through the filtering into units of 2N pixels, generating continuous 2N sets of two pixels from edge detection signals corresponding to 2N pixels of each division unit and the first pixel of a next division unit following said each division unit, the 2N pixels and the first pixel being continuous, and extracting, from the 2N sets, a set of two pixels having the largest absolute difference.

2. The image signal processing apparatus according to claim 1,
   wherein the first resolution is a 4K resolution, and
   wherein the second resolution is an HD resolution.

3. An imaging apparatus comprising:
   an image signal processing apparatus according to claim 1; and
   an imaging unit configured to obtain the image signal having the first resolution.

4. An image signal processing apparatus comprising:
   down-converter circuitry configured to down-convert an image signal having a first resolution into an image signal having a second resolution lower than the first resolution;
   high-frequency-band-edge detection circuitry configured to perform filtering on the image signal having the first resolution to extract components in a higher frequency band than a frequency corresponding to the second resolution and to perform down-conversion on an edge detection signal obtained through the filtering to obtain an edge detection signal having the second resolution; and
   combination circuitry configured to combine the edge detection signal having the second resolution obtained by the high-frequency-band-edge detection circuitry with the image signal having the second resolution generated by the down-converter circuitry so as to obtain an image signal having the second resolution for display,
   wherein the high-frequency-band-edge detection circuitry normalizes the edge detection signal obtained through the filtering by dividing the edge detection signal by an average of levels of the image signal having the first resolution and performs the down-conversion on the normalized edge detection signal.

5. An imaging apparatus comprising:
   an image signal processing apparatus according to claim 4; and
   an imaging unit configured to obtain the image signal having the first resolution.

6. An image signal processing apparatus comprising:
   down-converter circuitry configured to down-convert an image signal having a first resolution into an image signal having a second resolution lower than the first resolution;
   high-frequency-band-edge detection circuitry configured to perform filtering on the image signal having the first resolution to extract components in a higher frequency band than a frequency corresponding to the second resolution and to perform down-conversion on an edge detection signal obtained through the filtering to obtain an edge detection signal having the second resolution;

combination circuitry configured to combine the edge detection signal having the second resolution obtained by the high-frequency-band-edge detection circuitry with the image signal having the second resolution generated by the down-converter circuitry so as to obtain an image signal having the second resolution for display; and low-frequency-band-edge detection circuitry configured to obtain an edge detection signal having the second resolution on the basis of the image signal having the second resolution generated by the down-converter circuitry, wherein the combination circuitry combines, with the image signal having the second resolution generated by the down-converter circuitry, a first edge detection signal being the edge detection signal having the second resolution obtained by the high-frequency-band-edge detection circuitry and a second edge detection signal being the edge detection signal obtained by the low-frequency-band-edge detection circuitry so as to obtain the image signal having the second resolution for display.

7. The image signal processing apparatus according to claim 6, wherein the combination circuitry combines the first and second edge detection signals with the image signal having the second resolution in such a manner that edge information displayed based on the first edge detection signal is distinguishable from edge information displayed based on the second edge detection signal.

8. The image signal processing apparatus according to claim 7, wherein distinction between the edge information displayed based on the first edge detection signal and the edge information displayed based on the second edge detection signal is made by a difference in one of hue, luminance, and line type.

9. An imaging apparatus comprising:
an image signal processing apparatus according to claim 6; and
an imaging unit configured to obtain the image signal having the first resolution.

10. An image signal processing apparatus comprising:
down-converter circuitry configured to down-convert an image signal having a first resolution into an image signal having a second resolution lower than the first resolution;
high-frequency-band-edge detection circuitry configured to perform filtering on the image signal having the first resolution to extract components in a higher frequency band than a frequency corresponding to the second resolution and to perform down-conversion on an edge detection signal obtained through the filtering to obtain an edge detection signal having the second resolution; and
combination circuitry configured to combine the edge detection signal having the second resolution obtained by the high-frequency-band-edge detection circuitry with the image signal having the second resolution generated by the down-converter circuitry so as to obtain an image signal having the second resolution for display,
wherein the image signal having the first resolution is an image signal outputted from a single-CCD color imaging unit including an image sensor having a Bayer color filter array, and
wherein the high-frequency-band-edge detection circuitry obtains the edge detection signal having the second resolution on the basis of signals of diagonally arranged green pixels.

11. An imaging apparatus comprising:
an image signal processing apparatus according to claim 10; and
an imaging unit configured to obtain the image signal having the first resolution.

12. A method for displaying an image, the method comprising:
displaying, on a display device, an image based on an image signal, first edge information based on an edge detection signal detected on the basis of components of the image signal in a lower frequency band than a predetermined frequency, and second edge information based on an edge detection signal detected on the basis of components of the image signal in a higher frequency band than the predetermined frequency in such a manner that the first edge information and the second edge information are superimposed on the image and can be distinguished from each other,
wherein distinction between the displayed first edge information and the displayed second edge information is made by a difference in one of hue, luminance, and line type.

13. The method for displaying an image according to claim 12, wherein the predetermined frequency is a frequency corresponding to a resolution of the display device.

14. The method for displaying an image according to claim 12,
wherein the image signal is an output image signal from an imaging unit having a 4K resolution, and
wherein the display device has an HD resolution.

15. An image signal processing apparatus comprising:
down-converter circuitry configured to down-convert an image signal having a first resolution into an image signal having a second resolution lower than the first resolution;
high-frequency-band-edge detection circuitry configured to perform filtering on the image signal having the first resolution to extract components in a higher frequency band than a frequency corresponding to the second resolution and to perform down-conversion on an edge detection signal obtained through the filtering to obtain an edge detection signal having the second resolution, without incurring a loss of information in the extracted components in the higher frequency band; and
combination circuitry configured to combine the edge detection signal having the second resolution obtained by the high-frequency-band-edge detection circuitry with the image signal having the second resolution generated by the down-converter circuitry so as to obtain an image signal having the second resolution for display.

16. The image signal processing apparatus according to claim 15, wherein:
the image signal having the first resolution is an image signal outputted from a single-CCD color imaging unit including an image sensor having a Bayer color filter array, and
the high-frequency-band-edge detection unit obtains the edge detection signal having the second resolution on the basis of signals of diagonally arranged green pixels.

17. The image signal processing apparatus according to claim 15, wherein the first resolution is a 4K resolution and the second resolution is an HD resolution.

18. An imaging apparatus comprising:
an image signal processing apparatus according to claim 15; and
an imaging unit configured to obtain the image signal having the first resolution.

* * * * *